United States Patent [19]

Focke et al.

[11] Patent Number: 5,409,098

[45] Date of Patent: Apr. 25, 1995

[54] APPARATUS FOR THE TRANSPORT OF CIGARETTE PACKS

[75] Inventors: Heinz Focke; Martin Stiller, both of Verden, Germany

[73] Assignee: Focke & Co. (GmbH & Co.), Verden, Germany

[21] Appl. No.: 148,270

[22] Filed: Nov. 8, 1993

[30] Foreign Application Priority Data

Nov. 6, 1992 [DE] Germany .................. 42 37 508.8
Oct. 11, 1993 [DE] Germany .................. 43 34 479.8

[51] Int. Cl.⁶ .............................................. B65G 47/82
[52] U.S. Cl. ................................. 198/597; 198/457; 198/607
[58] Field of Search .............. 148/456, 457, 463.2, 148/463.3, 597, 598, 478.1, 607

[56] References Cited

U.S. PATENT DOCUMENTS

| | | | |
|---|---|---|---|
| 3,037,608 | 6/1962 | Rothschild | 198/597 X |
| 3,403,794 | 10/1968 | Lopez | 198/597 X |
| 3,589,497 | 6/1971 | Leach . | |
| 3,719,288 | 3/1973 | Schmitt et al. | 198/597 X |
| 3,779,361 | 12/1973 | Schmitt | 198/607 X |
| 3,876,058 | 4/1975 | Gray et al. . | |
| 3,954,165 | 5/1976 | Snyder . | |
| 4,577,745 | 3/1986 | Calvert et al. . | |
| 4,678,074 | 7/1987 | Focke et al. | 198/457 |
| 5,101,609 | 4/1992 | Cook . | |

FOREIGN PATENT DOCUMENTS

| | | |
|---|---|---|
| 0168548 | 1/1986 | European Pat. Off. . |
| 0142619 | 1/1989 | European Pat. Off. . |
| 0300619 | 1/1989 | European Pat. Off. . |
| 0496046 | 7/1992 | European Pat. Off. . |
| 2306911 | 11/1976 | France . |
| 0844576 | 7/1949 | Germany . |
| 0843527 | 5/1952 | Germany . |
| 2022602 | 5/1970 | Germany . |
| 7041816 | 2/1971 | Germany . |
| 2149178 | 4/1972 | Germany . |
| 2406427 | 8/1975 | Germany . |
| 2510094 | 11/1975 | Germany . |
| 2542069 | 3/1977 | Germany . |
| 2710435 | 12/1977 | Germany . |
| 3001652 | 9/1984 | Germany . |
| 3501404 | 7/1986 | Germany . |
| 8626442 | 1/1987 | Germany . |
| 3230533 | 4/1987 | Germany . |
| 3635722 | 5/1987 | Germany . |
| 3700928 | 7/1987 | Germany . |
| 8709053 | 10/1987 | Germany . |
| 3717146 | 12/1987 | Germany . |
| 3638538 | 5/1988 | Germany . |
| 3801388 | 7/1988 | Germany . |
| 0266333 | 3/1989 | Germany . |
| 3833390 | 5/1989 | Germany . |
| 3802463 | 8/1989 | Germany . |
| 3841805 | 2/1990 | Germany . |
| 8901375 | 7/1990 | Germany . |
| 1034055 | 6/1966 | United Kingdom . |
| 1208444 | 10/1970 | United Kingdom . |

OTHER PUBLICATIONS

Sichere Produktidentifikation im automatischen Materialfluss, Transport Forder-und Lagertechnik Nr. 12, 1990, pp. 6–7.
Cameras Help Sort Baggage at Stansted, Materials Handling News, Nov. 1991, p. 8.
JP-1-122821 A., Patent Abstracts of Japan, M-860, Aug. 16, 1989, vol. 13, No. 369.
Automation—Sep. 1965, pp. 107–108.

Primary Examiner—James R. Bidwell
Attorney, Agent, or Firm—Sughrue, Mion, Zinn, Macpeak & Seas

[57] ABSTRACT

In the region of a packaging installation for cigarettes or the like, partially finished cigarette packs (10) have to be transported over relatively long paths and, at the same time, brought into a specific relative position. A horizontal feed conveyor (18), a vertical conveyor (20) and a horizontal discharge conveyor (27) are arranged in such a manner that, not only is the transportation problem solved, but also the desired relative position of the packs (10) is produced. A transfer conveyor (29) deflects the packs (10), takes over the packs (10) from the vertical conveyor (20), moves them along a path in the form of a part circle in translational motion into the plane of the discharge conveyor (27), and transfers them to the latter.

19 Claims, 8 Drawing Sheets

APPARATUS FOR THE TRANSPORT OF CIGARETTE PACKS

DESCRIPTION

The invention relates to an apparatus for the transport of cuboid (cigarette) packs which are limited by rectangular front and rear faces, elongate, narrow side faces and small end and bottom faces, especially from a first packaging machine to a second packaging machine for an outer wrapping of the pack.

In packaging technology, a transport of completely or partially finished packs from one processing unit to another is often necessary within a packaging installation. In the production of cigarette packs, for example the finished packs are to be fed from the packaging machine for attaching an outer wrapping made of cellulose or plastic foil to a further packaging machine. These two packaging machines are arranged at a distance from one another for a variety of reasons, particularly for the purpose of easier accessibility, so that a relatively long path has to be covered during the transport of the packs.

The object on which the invention is based is to design an apparatus for the transport of (cigarette) packs, in such a way that, on the one hand, the adjacent units (packaging machines) are freely accessible on all sides and, on the other hand, the transported packs are brought into the best possible relative position.

To achieve this object, the apparatus according to the invention is characterized by the following features:
 a) the packs can be fed by a band-shaped feed conveyor, on which the packs rest with one side face, with the front or rear face pointing in the conveying direction,
 b) the feed conveyor is followed by a vertical conveyor having drivers for the packs, on which the packs rest with side faces directed downwards,
 c) at the upper end of a conveying path of the vertical conveyor, the packs can be pushed by a cross-conveyor into a subsequent (horizontal) discharge conveyor as a result of movement in the longitudinal direction of the packs, in such a way that, in the region of the discharge conveyor, these rest with a lower longitudinal face and point with their end face or bottom face in the conveying direction.

The combination of horizontal conveyors and vertical conveyors ensures that a space between the adjacent units (packaging machines) to be connected to one another for transport purposes is provided or maintained for a free passage and that the packs are discharged in the correct position.

A further subject of the invention is the transfer of the conveyed articles, namely packs, from the vertical conveyor to a cross-conveyor or a horizontal conveyor. According to the invention, there is provided, for this purpose, a transfer conveyor which has pack receptacles which are attached to endless conveying members and are moved solely in translational motion and which lift off the packs from the drivers of the vertical conveyor, transport them along an arcuate path of movement and deposit them on the discharge conveyor. The endless conveying members are preferably two rotary disks which are arranged with the axes of rotation offset relative to one another and between which the pack receptacles are fastened to parallel struts connecting the rotary disks to one another.

This transfer conveyor guarantees a careful movement of the packs from the vertical conveyor to the discharge conveyor at a high conveying speed.

Further particulars of the invention relate to the design and arrangement of the conveying members, especially of the transfer conveyor.

Exemplary embodiments of the invention are explained in more detail below by means of the drawings. In these.

The apparatuses illustrated in the drawings are concerned with the handling of cuboid packs 10, specifically cigarette packs of the hinge-lid type. These consist of thin cardboard. The packs 10 have parallel faces, namely a front face 11 and a rear face 12, narrow, elongate side faces 13 and 14 as well as a small end face 15—in the region of a lid—and a bottom face 16.

The packs 10 are to be transported over a relatively long path, specifically especially from a packaging machine 17 to a further packaging machine (not shown).

Figure 1:
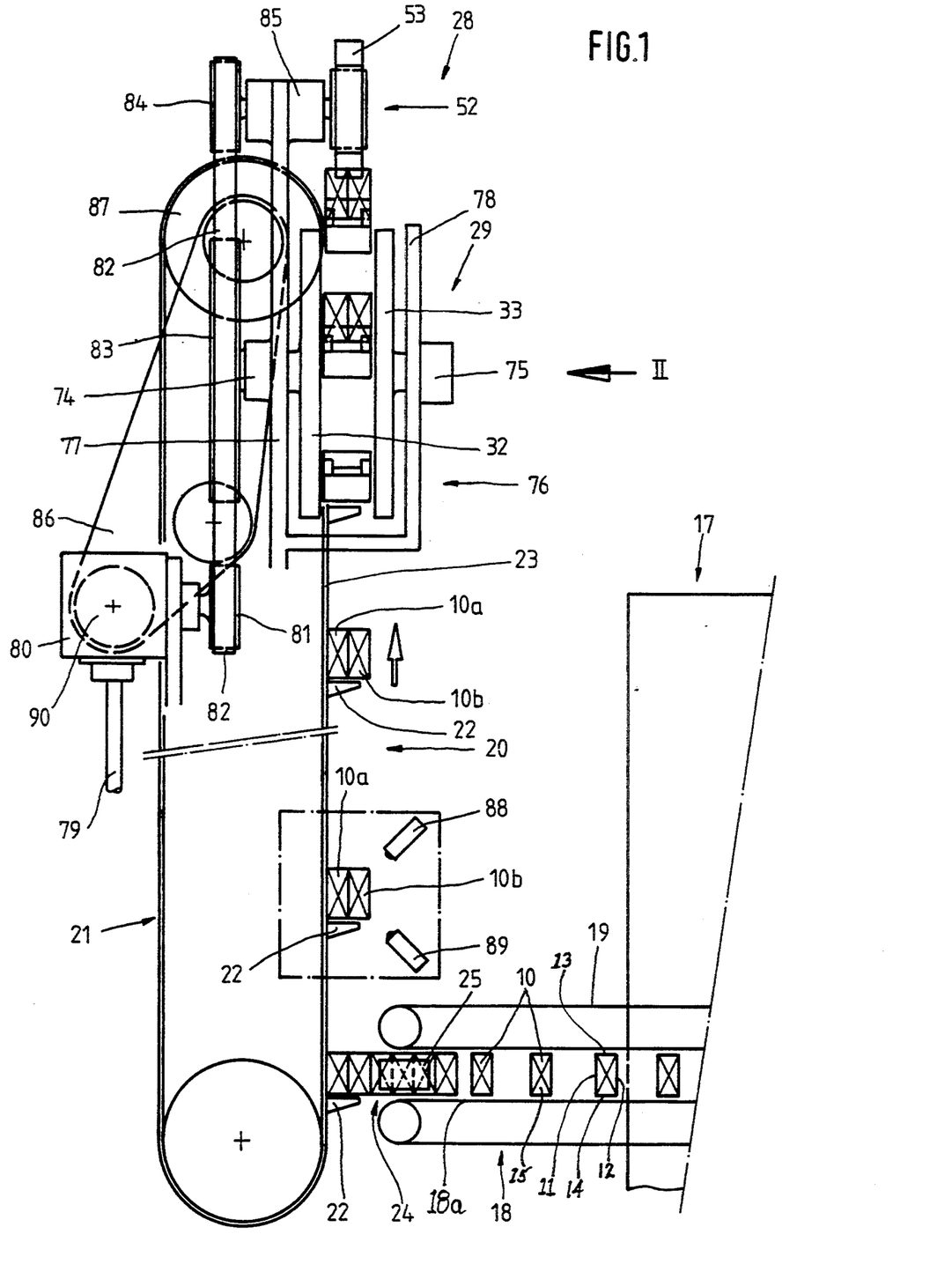
FIG. 1 shows a diagrammatic side view of a part region of the conveying apparatus.
Figure 2:
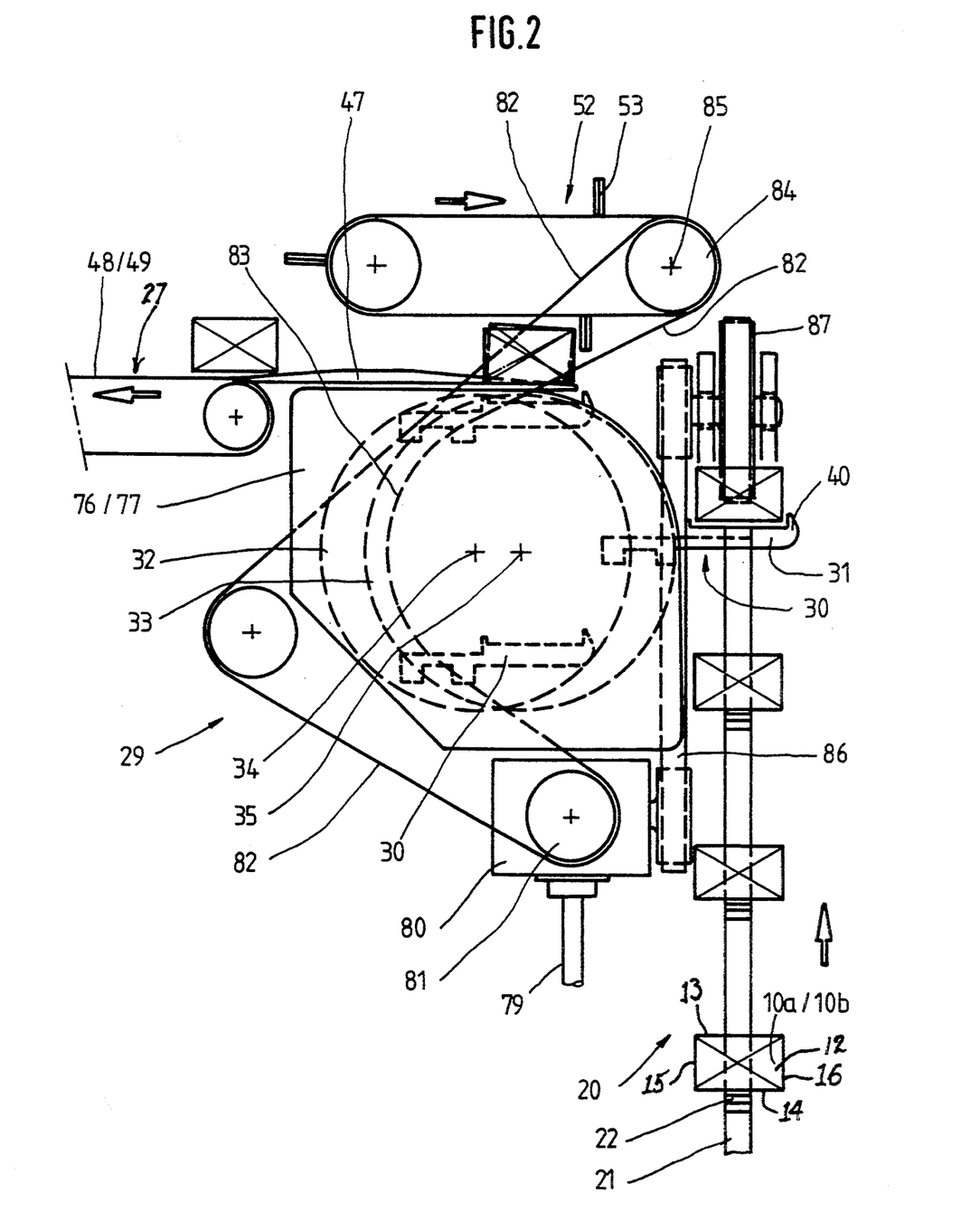
FIG. 2 shows a detail of the conveying apparatus according to FIG. 1 in a view offset by 90° according to the arrow II and on an enlarged scale.

The packs 10 are transported on the feed conveyor 18 in a relative position, in which the longitudinal extension is orientated transversely to the conveying direction. The elongate, narrow side faces 14 rest on a lower conveying strand 18a of the feed conveyor 18. The latter also is assigned an upper conveyor strand 19 which bears against the upwardly directed side faces 13 of the packs 10.

The feed conveyor 18 is followed by a vertical conveyor 20. This takes over the packs 10 directly from the feed conveyor 18. The vertical conveyor 20 consists of a rotating, endless pull member, namely a conveyor belt 21. Mountings or drivers 22 for supporting the packs 10 are arranged on this. The drivers 22 are directed horizontally in a platform-like manner in the region of a vertical conveying strand 23. In a lower position, the packs can each be conveyed directly onto a driver 22. The feed conveyor 18 forms a pack build-up 24 in this end region. The two front packs 10 are each time conveyed onto a driver 22, whilst the remaining packs of the pack build-up 24 are retained by a lateral braking member 25.

On the free side of the vertical conveyor 20 can be arranged a stationary, vertical guide. Its distance from the conveying strand 23 corresponds approximately to the transverse dimension of two packs 10a, 10b (width of the side faces 13, 14). The packs 10 slide along on the vertical guide (not shown).

In the region of an upper deflection of the belt 21, that is to say at the end of a vertical conveying path for the packs 10, the latter are transported away in the transverse direction by a discharge conveyor 27. This is designed here likewise as a belt conveyor. The packs 10 rest with a (lower) side face 14 on the discharge conveyor 27. However, the orientation of the packs 10 is such that the bottom face 16 (or the end face 15) points in the conveying direction.

A transfer station 28 is designed in a special way for the ordered careful transport of the packs 10 from the vertical conveyor 20 to the transversely or horizontally directed discharge conveyor 27. In the present exemplary embodiment, the packs 10 are transported further in a direction which is transverse or at right angles to the direction of transport of the feed conveyor 18.

In the transfer station 28, the packs are temporarily transported by a transfer conveyor 29. This takes over the packs 10 from the vertical conveyor 20, and, without a variation in the angular position, transports them along a conveying path in the form of an arc of a circle to the discharge conveyor 27.

Figure 3:
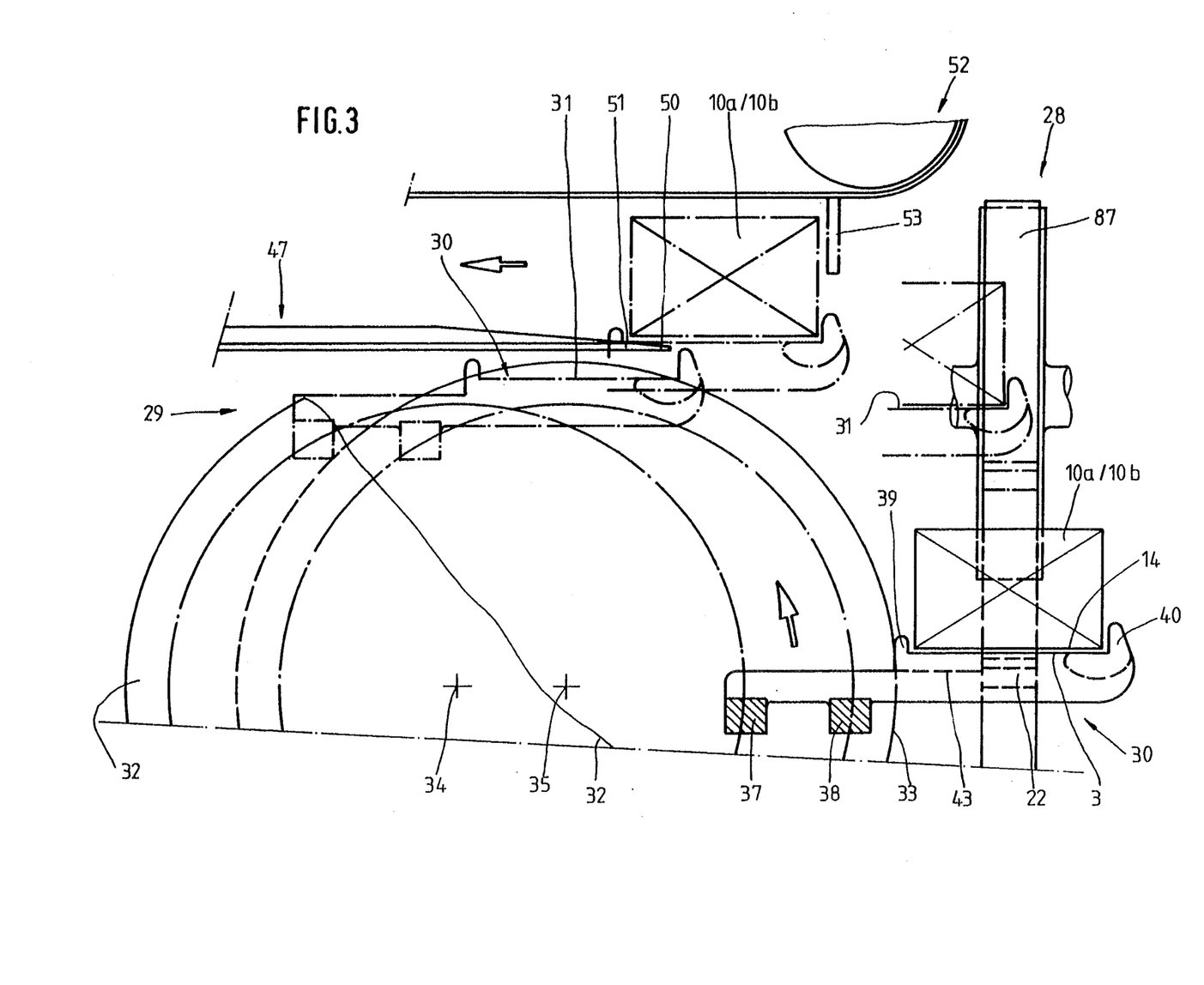
FIG. 3 shows a detail of a transfer conveyor in a view corresponding to that of FIG. 2, on a further-enlarged scale.
Figure 4:
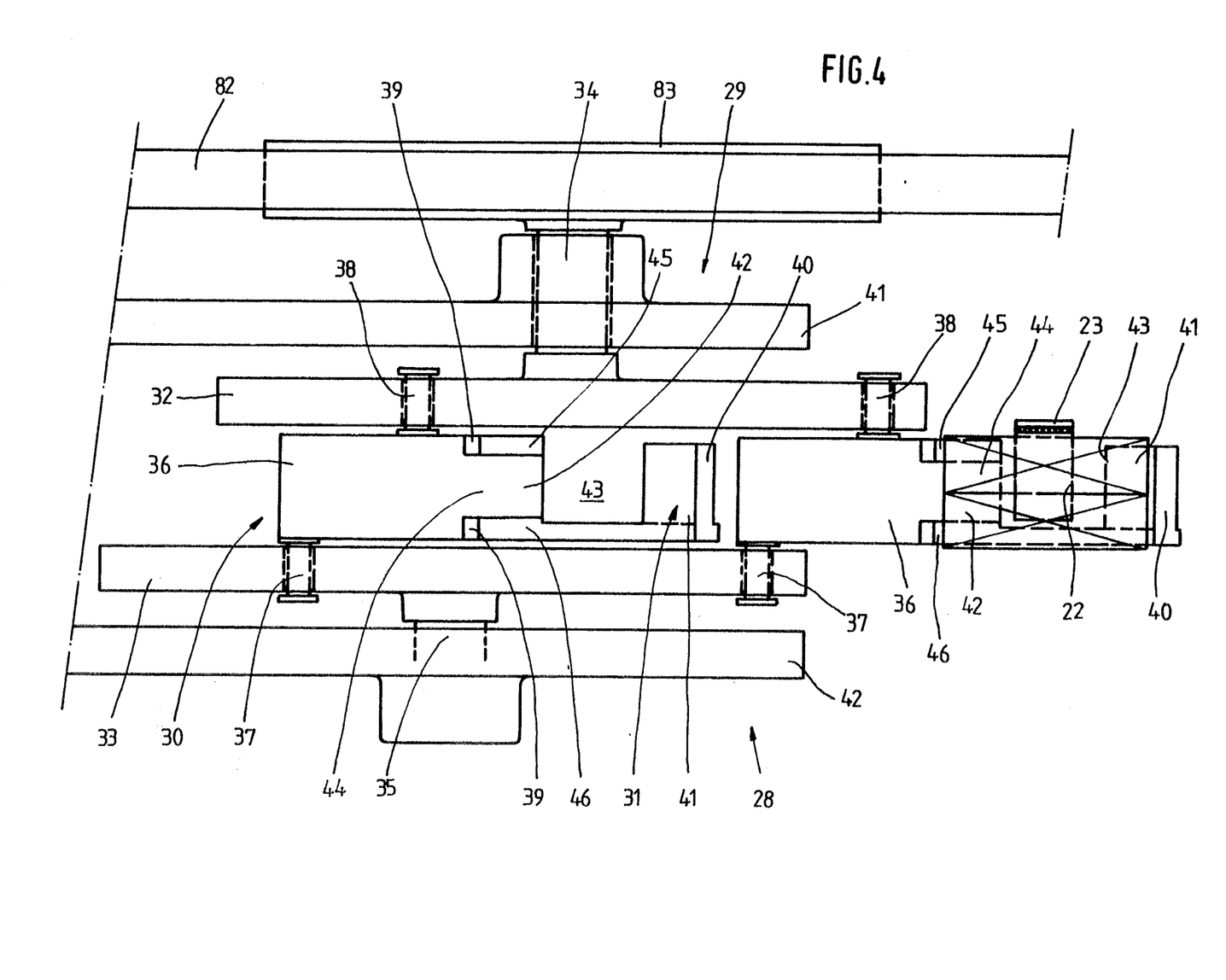
FIG. 4 shows the details of the transfer conveyor according to FIG. 3 in horizontal projection.

For this purpose, the transfer conveyor 29 is provided with a plurality of, namely three receptacles 30 which follow a closed path, in the form of an arc of a circle in the present case, in translational motion. The design and positioning of the pack receptacles 30 ensure that a platform 31 as a bearing surface for the (two) packs 10a, 10b is maintained in a horizontal position. For this purpose, the pack receptacles 30 are attached to or between two synchronously rotating endless conveyors, namely on circular rotary disks 32, 33. These are arranged in vertical planes parallel to one another at a distance which is slightly larger than the width of the (two) packs 10a, 10b to be handled. Axes of rotation 34, 35 of the rotary disks 32, 33 are mounted offset relative to one another in a horizontal plane.

The pack receptacles 30 have a carrier piece 36 mounted between the rotary disks 32, 33. This is constantly directed horizontally. Attached to mutually opposite sides are rotary bearings 37, 38 which are directed sideways and by means of which the pack receptacles 30 or their carrier pieces 36 are respectively connected rotatably to the two rotary disks 32, 33. The rotary bearings 37, 38 are arranged at a short distance from the free outer edge of the respective rotary disks 32, 33 and are offset relative to one another according to the distance between the axes of rotation 34, 35.

Joined to the carrier piece 36 on the free side is the platform 31 of the pack receptacle 30. This is provided radially on the outside and on the inside with a support for the pack 10a, 10b, namely with upwardly directed holding noses 39, 40. The platform 31 is shaped in such a way that it is possible for the packs 10 to be taken over from the vertical conveyor 20 or from its drivers 22. The platform 31 is made U-shaped in horizontal projection, with a radially outer carrying leg 41 and with an inner carrying leg 42. These surround a recess 43, open on one side, in the platform 31 for the passage of the drivers 22 when a pack 10 is taken over. The carrying leg 42 is provided with a central depression 44, in such a way that carrying webs 45 and 46 for mounting the (two) packs 10a, 10b are formed on both sides of the said depression.

When the packs 10 are taken over from the vertical conveyor 20 by the pack receptacles 30, the special movement characteristic of the transfer conveyor 29 comes into effect. The pack receptacle 30 enters the region of the vertical conveyor 20 from below, specifically in the path of movement of the packs 10a, 10b. Approximately level with the axes of rotation 34, 35, the pack receptacle 30 grasps the packs 10 on their underside—in the present case, on the side faces 14 pointing downwards. During further movement, the packs 10 are lifted off from the driver 22 by the pack receptacle 30 as a result of a higher speed. A sideways movement out of the region of the vertical conveyor 20 in the direction of the discharge conveyor 27 (dot-and-dash lines in FIG. 3) commences at the same time as a consequence of the path of movement of the pack receptacle 30.

In the region of the discharge conveyor 27, the packs 10 are transferred from the pack receptacle 30 to a horizontally directed, stationary carrier plate 47. On the latter, the packs 10 are transported further until they are taken over by conveyor bands 48, 49.

The packs 10a, 10b are transported by the rotating pack receptacles 30 to the level of the discharge conveyor 27 or of the carrier plate 47, the pack receptacles 30 having moved away from the vertical conveyor 20 (FIG. 3). In the highest position of the pack receptacles 30, the packs 10 are transferred to the discharge conveyor, namely to the carrier plate 47. The carrier plate 47, designed with a bevelled end 50, penetrates with a central tongue 51 into the depression 44 between the carrying webs 45, 46. While the pack receptacle 30 is dipping down as a result of the movement characteristic (FIG. 3), the further transport of the packs 10 is taken over by an intermediate conveyor 52 which consists of a conveyor band having transversely directed drivers 53. The packs are transported on the carrier plate 47 by the intermediate conveyor 52 until they are taken over by the conveyor bands 48, 49.

Figure 7:
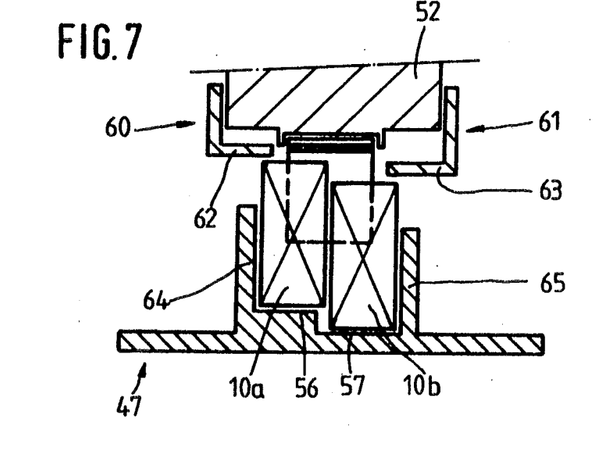
Figure 8:
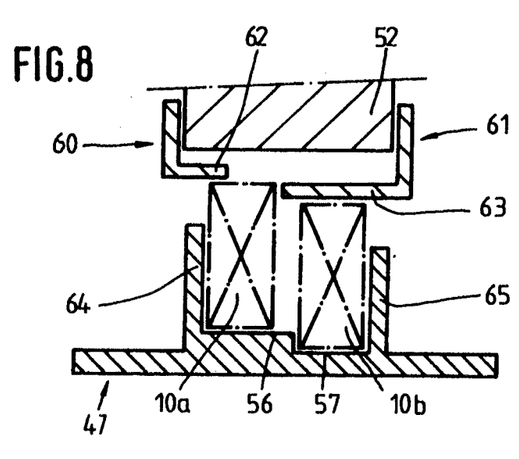
Figure 9:
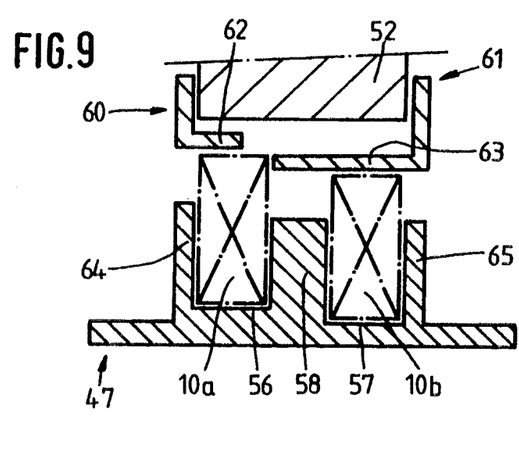

The initial region of the carrier plate 47 is provided with slot-shaped recesses 54, 55 extending in the longitudinal direction. The carrying webs 45, 46 of the pack receptacle 30 penetrate into these, whilst the packs 10a, 10b are deposited on the tongue 51 formed between the recesses 54, 55. This is provided, in a part region, with an obliquely rising sliding face 56 represented by dots in FIG. 5. This sliding face 56 is assigned to only one of the two packs, namely to the pack 10a (FIG. 7). The other pack 10b is moved further on a sliding face 57 which is formed alongside and which moreover corresponds to the plane of the carrier plate 47. The packs 10a, 10b therefore assume a vertically offset relative position in relation to one another. A step formed between the sliding faces 56, 57 gradually merges in the direction of transport into a partition wall 58 between the sliding faces 56, 57. During transport, the packs 10a, 10b are thus separated from one another in the region of the carrier plate 47 in a simple, reliable and careful way, so that they can finally be transferred to the two conveyor bands 48, 49 extending at a distance from one another. At the same time, the sliding face 56 for the packs 10a merges by way of a gradient 59 into the plane of the conveyor band 48.

Figure 5:
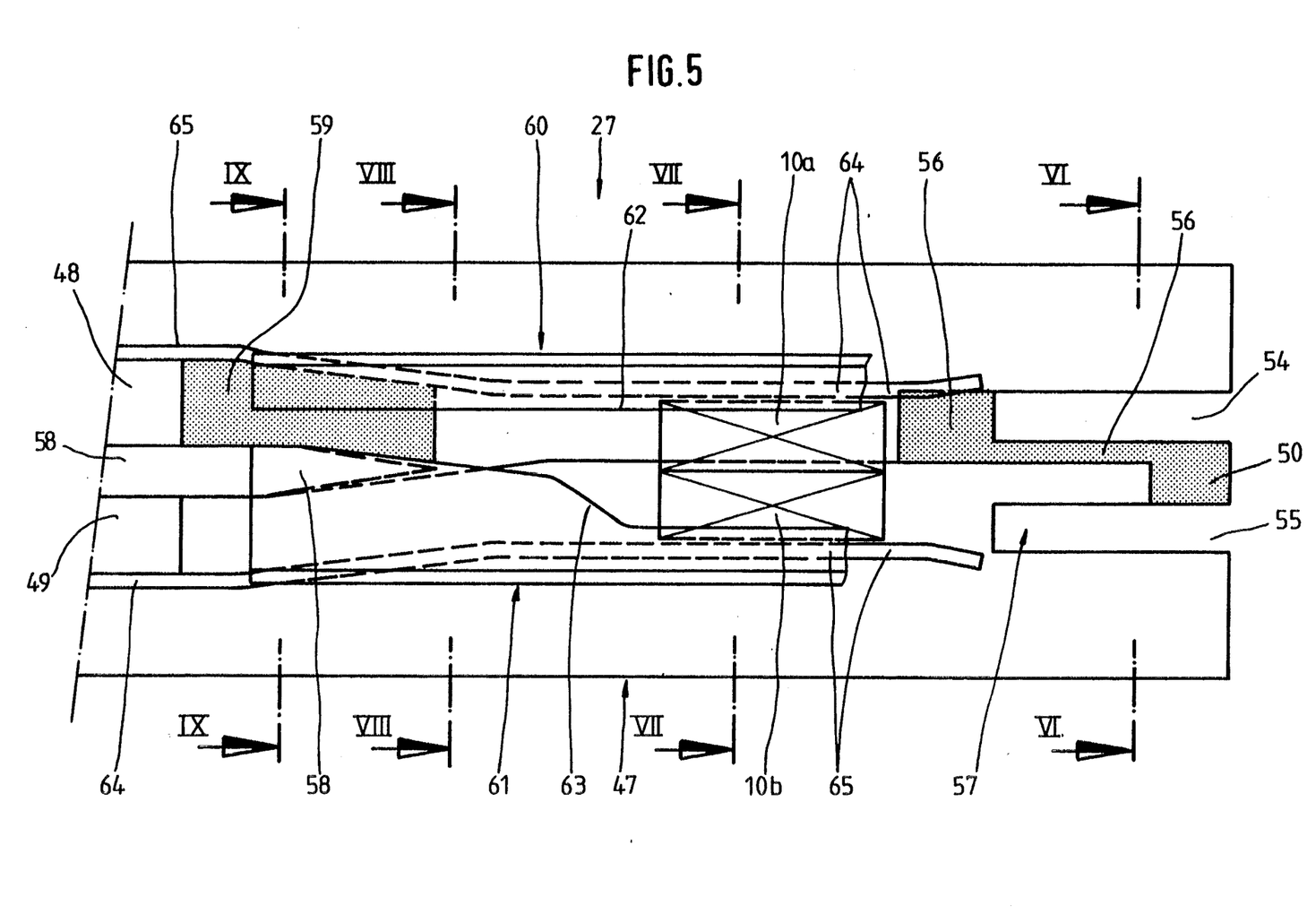
FIG. 5 shows details of a discharge conveyor following the transfer conveyor in horizontal projection.
Figure 6:
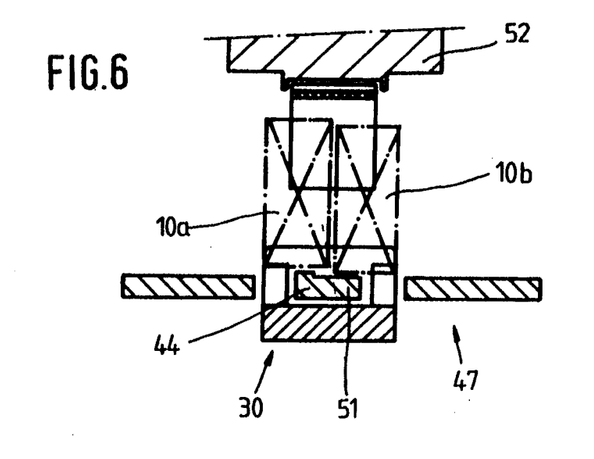
FIG. 6 to FIG. 9 show details of the discharge conveyor according to FIG. 5 in sectional planes VI to IX.

During transport in this region (by the intermediate conveyor 52), the packs 10a, 10b are assigned an upper guide 60, 61 having a horizontal guide leg 62, 63. The guide leg 63 for the packs 10b in the region of the lower sliding face 57 changes its shape in the direction of transport serves as a lateral guide for the adjacent pack 10b in the region where the packs 10a, 10b are divided along the two paths (conveyor bands 48, 49). Furthermore, there are provided in the region of the carrier plate 47 lateral guides 64, 65 for the packs 10a, 10b which also extend in the region of the conveyor bands 48, 49.

Figure 10:
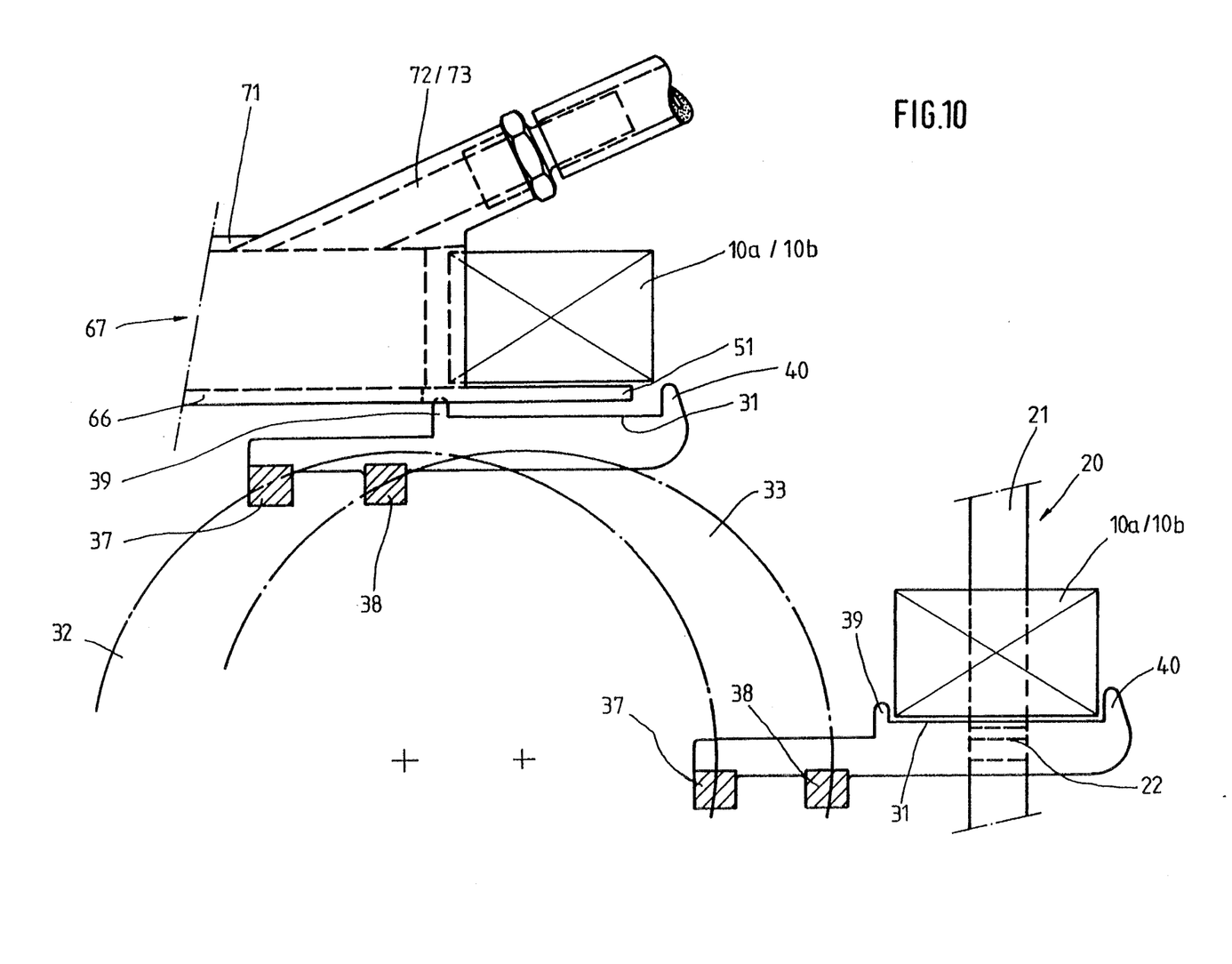
FIG. 10 shows a side view of an alternative version of a discharge conveyor corresponding to that of FIG. 5.
Figure 11:
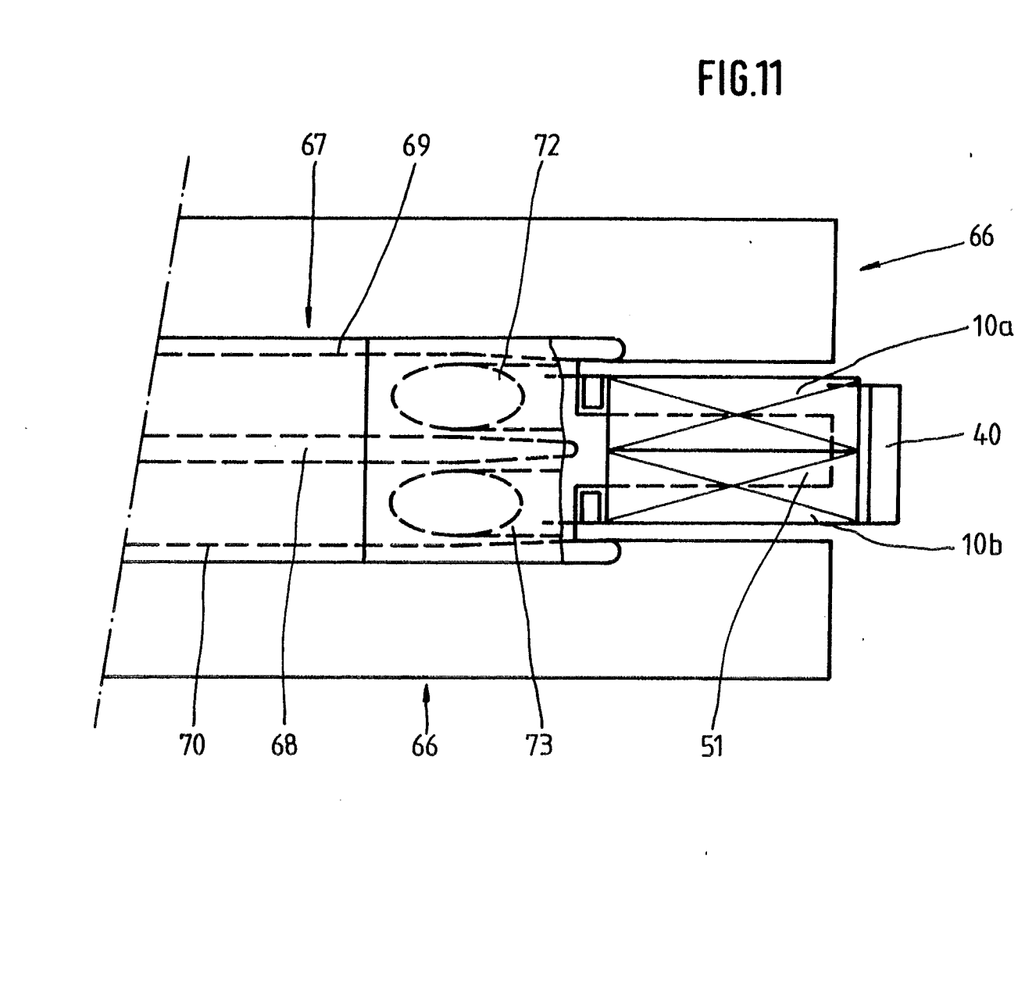
FIG. 11 shows a representation of FIG. 10 in horizontal projection.

An alternative for the above-described members for transporting away the packs 10a, 10b fed from the transfer conveyor 29 to the discharge conveyor 27 is shown in FIGS. 10 and 11. The packs 10a, 10b, deposited on a carrier plate 66 in a similar way to the exemplary embodiment of FIG. 5, are conveyed further by blowing air or a vacuum. For this purpose, the initial region of the carrier plate 66 is followed by the conveying channel 67 of closed cross-section for the packs 10a, 10b. The conveying channel 67 is sub-divided by a middle partition wall 68 into two part channels 69, 70 which are each assigned to a pack 10a, 10b and the cross-section of which corresponds to that of the packs. In the region of a covering wall 71 of the conveying channel 67, blowing air or compressed air flowing in the conveying direction is supplied from above. For this purpose, compressed-air connections 72, 73 open out in the initial region of the conveying channel 67. These are compressed-air channels which point at an acute angle to the longitudinal direction of the conveying channel 67 and which guide compressed air in the conveying direction into each part channel 69, 70. Outlets of the compressed-air connections 72, 73 are located at a distance from the start of the conveying channel 67. There consequently occurs in this initial region of the conveying channel 67 a vacuum which draws the packs 10a, 10b into the conveying channel 67 in a careful, but reliable way and which, at the same time, automatically distributes them to the part channels 69, 70.

After a particular conveying path with compressed air, that is to say after the conveying channel 67, the further transport of the packs can take place by means of conveyor bands. To drive the transfer conveyor 29, the two rotary disks 32, 33 are mounted by means of journals in rotary bearings 74, 75 of a carrier frame 76. This has two carrying legs 77, 78 of unequal length, to which the rotary bearings 74, 75 are attached. The carrier frame 76 is connected to the machine stand. The drive is transmitted directly to the rotary disk 32 only. The opposite rotary disk 33 is driven via the pack receptacles 30.

The central drive consists of a main shaft 79 which is connected to a central gear 80. The latter drives the transfer conveyor 29 and intermediate conveyor 52 on the one hand and the vertical conveyor 20 on the other hand.

A first driving wheel 81, arranged laterally on the central gear 80 is assigned to a drive for the transfer turret 29. A drive belt 82 transmits the drive to the gearwheel 83 which is connected to the rotary disk 32 via the rotary bearing 74.

The same drive belt 82 acts on a further driving wheel 84 which is assigned to the intermediate conveyor 52. A rotary bearing 85 for the latter is arranged in an upwardly extended region of the carrying legs 77.

Another second driving wheel 90 of the central gear 80 acts on a drive band 86 for the drive of an upper deflecting roller 87 of the vertical conveyor 20.

In the region of the vertical conveyor 20, the packs 10 are largely exposed on the drivers 22. It is therefore possible, in this region, to carry out an opto-electrical check of the packs 10 by means of sensors 88, 89 which are directed towards the packs 10 from below and above and sideways. The packs 10 can thus be checked in this region for a correct formation without any interruption of the conveying operation.

We claim:

1. An apparatus for transporting, in a conveying direction along a conveying path, cuboid packs, which are defined by rectangular front and rear faces (11, 12), two elongate narrow side faces (13, 14) and small top end and bottom faces (15, 16), from a first packaging machine to a second packaging machine for an outer wrapping of each pack, said apparatus comprising:
   a) a band-shaped feed conveyor (18) for horizontally feeding the packs in the conveying direction, and for supporting the packs (10) such that they rest with one (14) of said two elongate narrow side faces (13, 14) on said feed conveyor (18), and with the front face (11) pointing in the conveying direction;
   b) a vertical conveyor (20) which follows said feed conveyor (18) in the conveying direction, and which conveys the packs (10) vertically upwards along said conveying path, with the other one (13) of said two elongate narrow side faces (13, 14) pointing in the conveying direction;
   c) a plurality of pack-supporting drivers (23) mounted on said vertical conveyor (20);
   d) said feed conveyor 18) having the function of pushing onto said drivers two packs (10) from the feed conveyor (18), so that the two packs (10) rest on each of the drivers (22) with said one narrow elongate side face (14) directed downwards, and with the front face (11) of one of the two packs contacting the rear face (12) of the other of the two packs; and
   e) at an upper end of the vertical conveying path of the vertical conveyor (20), a horizontal discharge conveyor (27) and a transfer conveyor (29) for feeding the packs (10) into the following horizontal discharge conveyor (27) as a result of a movement in the direction of the elongate dimension of the packs (10), and in such a way that each pack rests with said one elongate narrow side face (14) on the discharge conveyor (27) and points with one of said end and bottom faces (15, 16) in the conveying direction.

2. The apparatus according to claim 1, characterized in that the feed conveyor (18) pushes the packs onto the drivers (22) on a free side thereof which is located opposite the vertical conveyor strand (23).

3. The apparatus according to claim 1, further comprising photoelectric test members (88, 89) for, during upward transport of the packs by the vertical conveyor (20), checking the packs (10) in regions of the side faces (13, 14), said test members pointing upwards, downwards and laterally, the drivers (22) being dimensioned in such a way to expose the regions to be tested of the side faces (13, 14).

4. The apparatus according to claim 1, wherein said vertical conveyor (20) has an upright vertical conveyor strand (23) which contacts one (11) of said rear and front faces (11, 12) of the packs on said drivers (22).

5. The apparatus according to claim 1, characterized in that the discharge conveyor (27) has two conveyor bands (48, 49), arranged at a distance from one another, for distributing the packs to two different conveyor paths.

6. The apparatus according to claim 1, wherein the packs (10) on the feed conveyor (18) rest on a conveyor strand (18a) thereof, and further comprising an upper conveyor (19) which bears against the other (13) of the elongate narrow side faces of the packs (10).

7. The apparatus according to claim 1, wherein the packs (10) form a queue of packs on the feed conveyor (18) immediately before the vertical conveyor (20), and wherein said feed conveyor (18) pushes two packs (10) first in the queue onto one of the drivers (22) which convey the two packs upwards, an wherein said apparatus further comprises a lateral braking member (25) for retaining the other packs during said pushing.

8. The apparatus according to claim 1, further comprising means for simultaneously feeding the packs (10) to the horizontal discharge conveyor (27) in an upward movement, apart from said movement in said longitudinal direction of the packs 10.

9. The apparatus according to claim 1, characterized in that the transfer conveyor (29) and the vertical conveyor (20) are moved by a common, central drive via a main shaft (79) having a central gear (80) and, respectively, via a drive belt (82) and a drive band (86) which are driven by the central gear (80).

10. An apparatus for transferring packs (10), fed by a vertical conveyor (20), to a horizontally directed discharge conveyor (27), the packs (10) resting, in the region of the vertical conveyor (20), on pack-supporting drivers (22) of the latter, characterized by a transfer conveyor (29) having pack receptacles (30) which are attached to endless conveying members and are moved solely in translational motion and which each lift off from the drivers (22) at least one pack (10) which is transported along an arcuate path of movement and deposited on the discharge conveyor (27); and further characterized in that said endless conveying members are two circular conveyors (32, 33), arranged in vertical parallel planes and with axes of rotation (34, 35) offset relative to one another, in such a way that a pack-receiving platform (31) of each pack receptacle (30) is constantly directed horizontally.

11. The apparatus according to claim 10, characterized in that said two circular conveyors are two rotary disks (32, 33), and in that each pack receptacle (30) is connected to the two rotary disks (32, 33) by means of two rotary bearings (37, 38) arranged in a common horizontal plane and at a distance from one another and arranged on opposite sides.

12. Apparatus according to claim 11, characterized in that each pack receptacle (30) is mounted on the two rotary disks (32, 33) by means of a carrier piece (36) and projects beyond the rotary disks (32, 33), at least in the region of the conveying path in the form of an arc of a circle, by means of the platform (31) for receiving packs (10, 10a, 10b).

13. Apparatus according to claim 12, characterized in that the platform (31) has a recess (43) which is coordinated in terms of positioning and size with the drivers (22) of the vertical conveyor (20), in such a way that, as a result of an upward movement relative to a driver (22), the platform (31) of the pack receptacle (30) lifts off packs (10) from the driver (22) and moves them out of the region of the vertical conveyor (20).

14. Apparatus according to claim 10, characterized in that the packs (10) can be deposited by the transfer conveyor (29) on plate (47) of the discharge conveyor (27), the carrier plate (47) penetrating into a recess (54) of the platform (31) by means of a tongue (51) for the purpose of taking over the pack.

15. The apparatus according to claim 14, characterized in that the packs (10) are transported in the region of the carrier plate (47) by an intermediate conveyor (52) which comprises a belt arranged above the carrier plate (47) and having drivers (53) grasping the packs.

16. An apparatus for transferring packs (10), fed by a vertical conveyor (20), to a horizontally directed discharge conveyor (27), the packs (10) resting, in the region of the vertical conveyor (20), on pack-supporting drivers (22) of the latter, characterized by a transfer conveyor (29) having pack receptacles (30) which are attached to endless conveying members and are moved solely in translational motion and which each lift off from the drivers (22) at least one pack (10) which is transported along an arcuate path of movement and deposited on the discharge conveyor (27); and further characterized in that the packs (10) are deposited by the transfer conveyor (29) on a carrier plate (47) of the discharge conveyor (27), and in that the packs (10) are transported in the region of the carrier plate (47) by an intermediate conveyor (52) which comprises a belt arranged above the carrier plate (47) and having drivers (53) grasping the packs.

17. The apparatus according to claim 16, further characterized in that said endless conveying members are two circular conveyors (32, 33) arranged in vertical parallel planes and with axes of rotation (34, 35) offset relative to one another, in such a way that a pack-receiving platform (31) of each pack receptacle (30) is constantly directed horizontally.

18. The apparatus according to claim 17, wherein the carrier plate (47) penetrates into a recess (54) of the platform (31) by means of a tongue (51) for the purpose of taking over the pack.

19. The apparatus according to claim 9 further comprising an intermediate conveyor (52) which also is moved by said common, central drive via said main shaft (79) and via said drive belt (82).

* * * * *